Jan. 4, 1966    C. H. MOELLER    3,227,016
GLASS CUTTING TOOL
Filed July 25, 1963    4 Sheets-Sheet 2
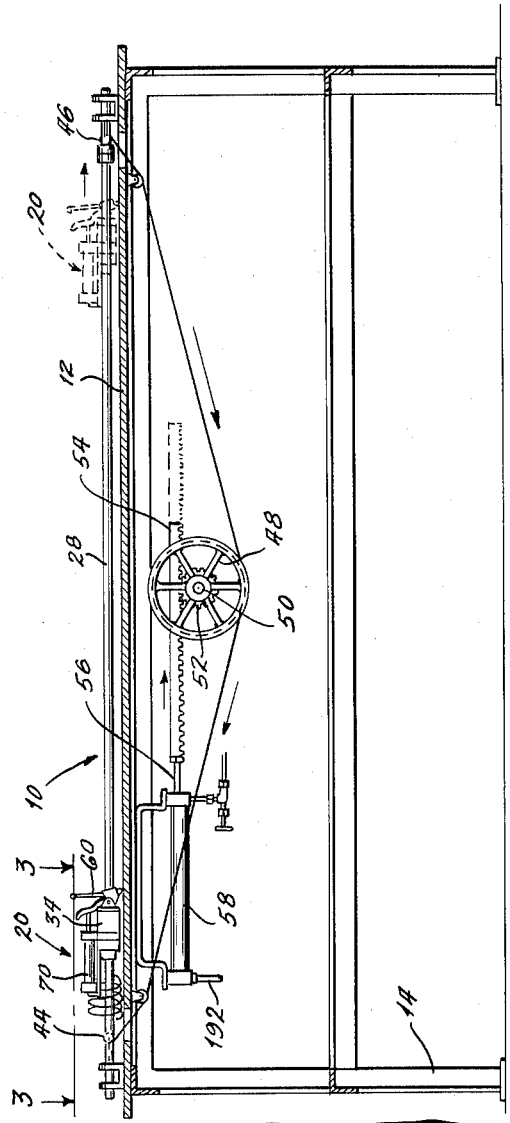
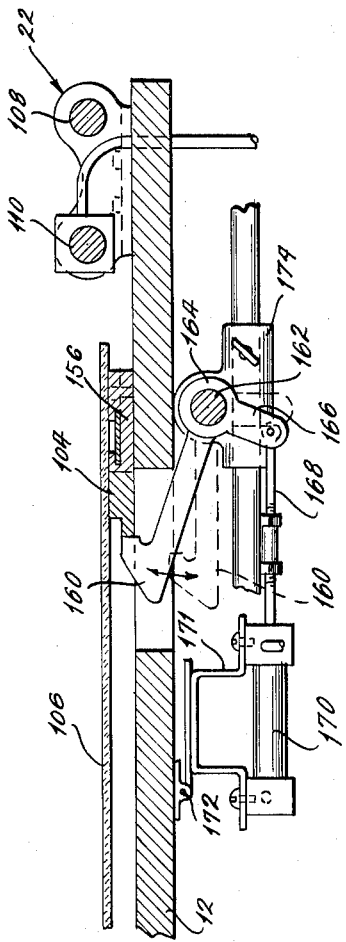
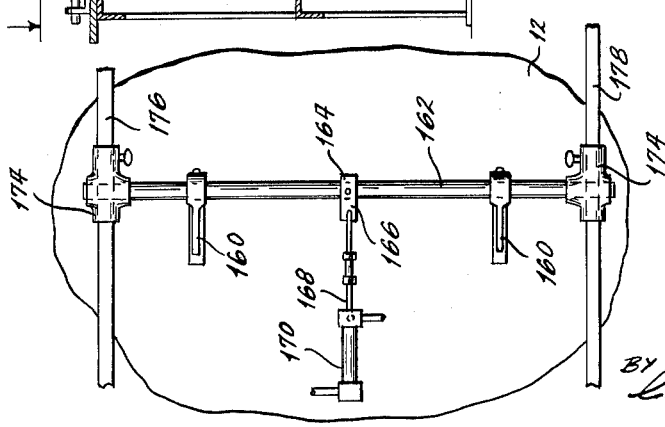
INVENTOR:
CHESTER H. MOELLER
BY Charles B. Haverstock
ATTORNEY.

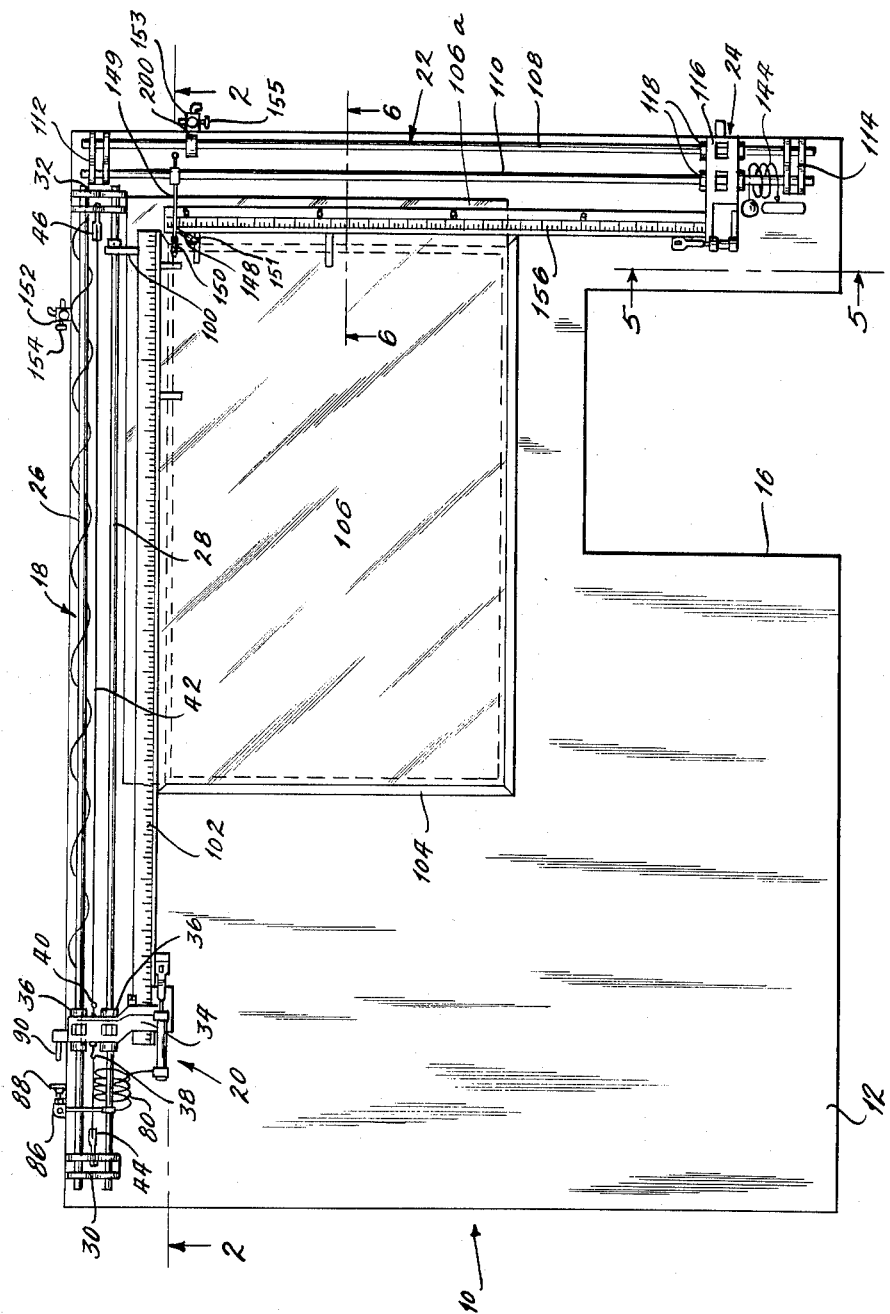

Jan. 4, 1966  C. H. MOELLER  3,227,016
GLASS CUTTING TOOL

Filed July 25, 1963  4 Sheets-Sheet 3

INVENTOR
CHESTER H. MOELLER
BY Charles B. Haverstock
ATTORNEY.

INVENTOR:
CHESTER H. MOELLER
BY Charles B. Haverstock
ATTORNEY.

United States Patent Office 3,227,016
Patented Jan. 4, 1966

3,227,016
GLASS CUTTING TOOL
Chester H. Moeller, 8316 Racquet Drive,
Normandy, Mo.
Filed July 25, 1963, Ser. No. 297,599
11 Claims. (Cl. 83—11)

The present invention relates generally to glass cutting tools and the like and more particularly to a versatile tool capable of cutting different sizes and shapes of glass panes and capable of operating in conjunction with glass framing devices.

Many glass cutting tools have been constructed and used heretofore. For the most part, however, the known devices are difficult and time consuming to operate, are relatively inflexible for cutting different sizes and shapes of panes, and require relocating panes to perform succeeding operations thereon. The known devices are also structurally relatively complicated and are relatively expensive. Furthermore, the known devices require relatively skilled operators.

These and other disadvantages and shortcomings of known glass cutting devices are overcome by the present invention which teaches the construction and operation of a novel glass cutting device including a table having locator means thereon for accurately positioning a pane of glass to be cut, a cutter member including guide means therefor positioned above the table, means for moving the cutter member along said guide means, and other means for predeterminedly moving the cutter member into and out of cutting engagement with a pane of glass positioned on the table during said movement. The subject invention also includes a second movable cutter assembly including guide means therefor for cutting along a different part of the glass pane, and means for predeterminedly positioning a pane of glass and a framing device therefor on the table during cutting operations.

A main object of the present invention is to provide improved means for cutting glass panes and the like.

Another object is to provide a relatively inexpensive glass cutting tool.

Another object is to provide a glass cutting tool that can be operated accurately even by relatively unskilled persons.

Another object is to provide a versatile glass cutting tool which is easily and quickly adjustable for cutting different sizes and shapes of glass panes.

Another object is to provide a glass cutter tool that can operate to cut glass to fit different sizes and shapes of framing devices.

Another object is to provide a glass cutter tool that is relatively safe to use.

Another object is to substantially reduce or eliminate human errors in glass cutting operations.

Another object is to increase the speed, accuracy, flexibility and efficiency of glass cutting operations.

These and other objects and advantages of the present device will become apparent after considering the following detailed specification of several embodiments thereof in conjunction with the accompanying drawings, wherein:

FIG. 1 is a top plan view of a glass cutting device constructed according to the present invention;

FIG. 2 is a cross-sectional view taken along line 2—2 of FIG. 1;

FIG. 6 is an enlarged fragmentary cross-sectional view taken on line 6—6 of FIG. 1;

FIG. 7 is a bottom view of the clamping means shown in FIG. 6;

Figure 3:
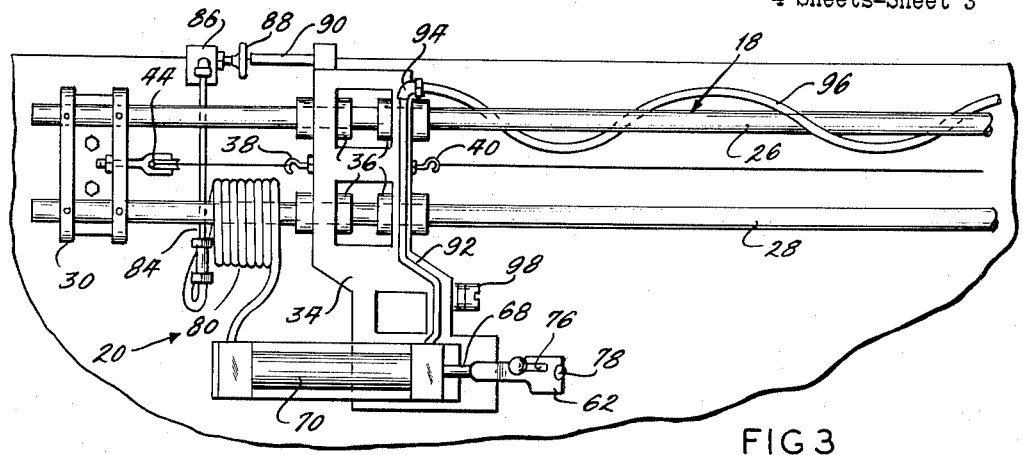
FIG. 3 is an enlarged fragmentary top plan view showing one of the movable cutter assemblies employed on the subject device as seen along line 3—3 or FIG. 2.

Referring to the drawings more particularly by reference numbers, number 10 is a cutting tool constructed according to the present invention. The tool 10 includes a cutting table 12 supported on legs 14. The table has a cutout portion 16 in one side where the operator stands to be near to the work.

Tracks for movably supporting and guiding cutter assemblies are positioned extending along two sides of the table as shown in FIG. 1. One of the tracks is numbered 18 and extends along the far side of the table 12 from the operator. The track 18 supports and guides a movable cutter assembly 20. Another track 22 extends along the right side of the table from where the operator stands and supports and guides another movable cutter assembly 24.

The track 18 includes two parallel rails 26 and 28 which are supported above the table by spaced brackets 30 and 32. The cutter assembly 20 includes a slide portion 34 having spaced pairs of bushings 36 that slide on the rails 26 and 28. The slide portion 34 also has eyelets 38 and 40 on opposite sides thereof which are connected to opposite ends of a flexible drive cable 42. The cable 42 extends from the opposite ends of the slide portion 34 along the track 18 between the rails 26 and 28, and one end of the cable 42 extends around a pulley 44 at one end of the track 18, and the opposite end portion of the cable extends around a similar pulley 46 located near the other end of the same track. The cable 42 also extends downwardly through holes in the table and is wound around a drive wheel 48 centrally located under the table 12.

The drive wheel 48 is mounted on a shaft 50 located under the table, and the shaft 50 also carries a pinion gear 52 that meshes with a rack gear 54 which is connected to a piston and rod assembly 56. The assembly 56 is part of a hydraulic motor 58 also mounted under the table. The motor 58 has conduit connections at both ends which are also connected to a controlled source of hydraulic pressure which will be described more in detail hereinafter. At this point it is sufficient to note that when the drive wheel 48 is rotated in one direction the cutter assembly 20 will move along the track 18 in one direction, and when the drive wheel is rotated in the opposite direction the assembly 20 will move in the opposite direction.

The slide portion 34 of the cutter assembly 20 extends beyond the inner rail 28 over the cutting table 12 and pivotally supports a glass cutter tool 60 which is mounted on a tool carrier member 62. The carrier member 62 is in turn pivotally supported on a bracket 64 which is adjustably attached to a side edge of the slide portion 34 by threaded connectors which extend through elongated openings 65. The carrier 62 has an upwardly extending arm portion 66 which is connected to a piston and rod assembly 68 of a hydraulic motor 70. The motor 70 is mounted on a plate member or bracket 72 that pivots on a shaft 74 attached to the upper surface of the slide 34. This enables the motor 70 to be operated without binding.

The cutter tool 60 is installed in a hole 76 in the carrier member 62 and is maintained in position by a set screw 78. The cutter tool 60 may be a commercial glass cutting tool of a well known type, and the tool is easily and quickly installed and replaced.

One end of the motor 70 is connected to the hydraulic system by a coiled flexible conduit 80 positioned on the rail 28. Suitable fittings are provided for the ends of the conduit 80 to connect it to the motor 70 and to another conduit 84 (FIG. 3). The conduit 84 is connected to a control valve 86 mounted on the table 12, and the valve 86 has an operating member or plunger 88 which cooperates with an actuator member 90 located on the slide 34. The function and operation of the valve 86 will be described hereinafter in connection with FIG. 8.

Figure 4:
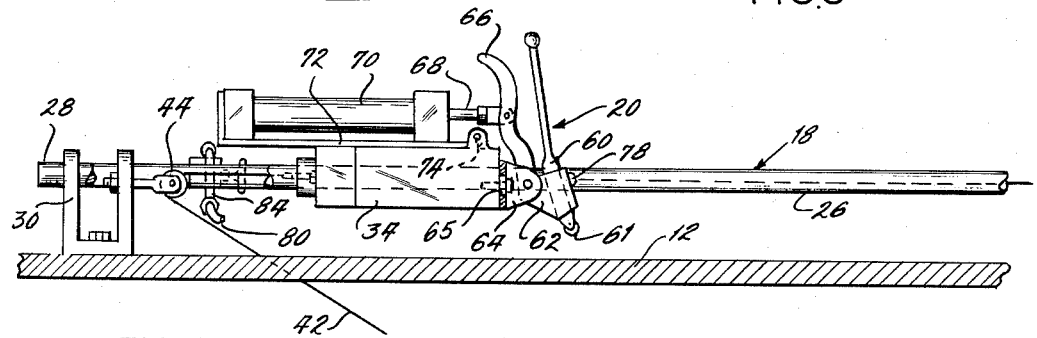
FIG. 4 is an enlarged side elevational view of the cutter assembly of FIG. 3.

The opposite end of the motor 70 from where the cable 80 is connected, is connected to another conduit 92 also attached to the slide 34. The conduit 92 is connected to an elbow fitting 94 and to another coiled flexible conduit 96 which is positioned on the rail 26. The opposite end of the conduit 96 is connected to the hydraulic system of FIG. 8. When fluid pressure is supplied to the motor 70 through the flexible conduit 80 the piston and rod assembly 68 moves to extended position, and in so doing causes the cutter tool 60 to be moved down into cutting engagement with a glass pane. On the other hand, when the flexible conduit 96 is supplying fluid pressure to the motor 70 the piston and rod assembly 68 is retracted into the motor 70 and the cutter tool is thereby raised to its inoperative position as shown in FIG. 4.

The slide 34 also has a stud member 98 attached to one side edge thereof. The stud 98 is made of a magnetized material and is positioned to cooperatively engage a member 100 mounted on the rail 28 near the right end thereof as shown in FIG. 1. Engagement between the stud 98 and the member 100 takes place at the extreme end of travel of the slide just before a cutting operation starts, and is provided to momentarily stop the slide to allow time for cutter tool 60 to move downwardly into cutting engagement with the glass before the cutting operation begins. The entire operation of the cutter assembly 20 can be made automatic, or if desired, it can be manual.

A straight edge or rule 102 is mounted on the table 12 parallel to the track 18 and serves as a stop for accurately positioning a frame member 104 on which a glass pane 106 is positioned during cutting. The frame 104 serves as a template on which the glass pane can be quickly and accurately located during cutting. It is important to note in this connection that the subject tool will accommodate any size or shape of frame within the limits of movement of the cutter assemblies. This means that a different size glass pane can be cut each time the machine is used without requiring any changes or adjustments in the machine except possibly when frames with different width frame pieces are used. The frames are held in position on the subject device by clamping means which will be described later.

The second movable cutter assembly 24 is mounted for movement on the track 22 which extends along the right side of the table 12 (FIG. 1). The cutter assembly 24 is normally used to cut the shorter side of a pane and for this reason and also for the reason that it is more easily accessible, lends itself more readily to being manually operated rather than automatically operated like the assembly 20. It is clearly within the scope of the invention, however, to have both assemblies 20 and 24 fully or partially automated, as desired.

The track 22, like the track 18 includes two parallel rails 108 and 110 supported adjacent their ends by brackets 112 and 114. The assembly 24 includes a slide member 116 with suitable bushings 118 that slide on the rails 108 and 110, and like the slide 34, the slide 116 has a tool carrier member 120 pivotally mounted on a bracket 122, and a cutter tool 124 similar to the cutter tool 60 is mounted on the carrier 120 and is locked in position thereon by a set screw 126.

The carrier 120 for the cutter tool 124 also has an upwardly extending arm portion 127 that is pivotally connected to piston and rod assembly 128 of fluid motor 130. The motor 130 is mounted on a plate 132 that is pivotally connected to the slide 116 by a pivot shaft 134 to prevent binding between the piston and rod assembly 128 and the carrier 120 during operation thereof. A manually operated valve 136 is mounted behind the motor 130 and has an operating member 138 which controls the operation thereof. Immediately behind the valve 136 is a manual grip or handle 140 which is grasped by the operator to move the assembly 24 along the rails 108 and 110. When the operator grasps the handle 140 he can also operate the valve 136 which controls the raising and lowering of the cutter tool 124.

Figure 5:
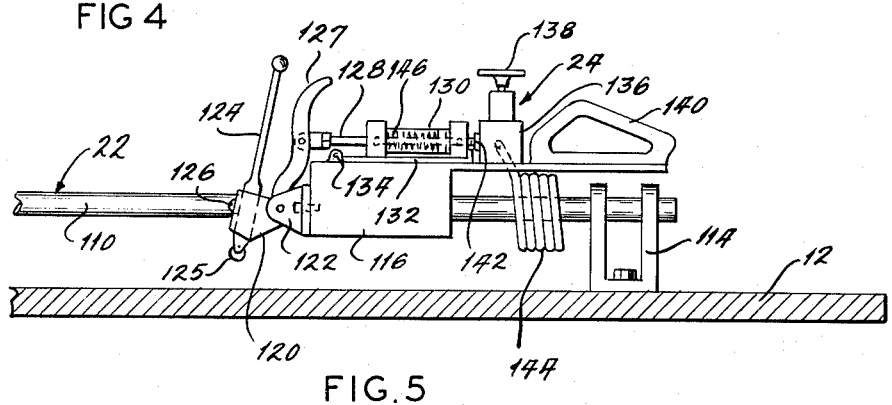
FIG. 5 is an enlarged side elevational view, partly in section, of another movable cutter assembly, taken on line 5—5 of FIG. 1.
Figure 8:
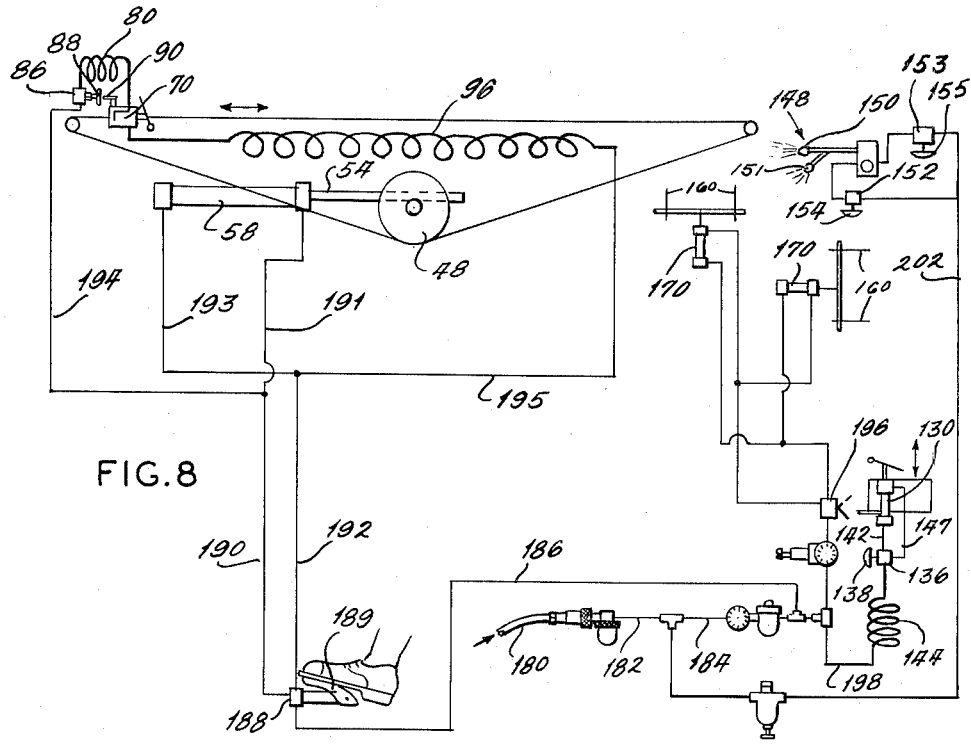
FIG. 8 is a schematic view of a hydraulic system for the subject device.

The valve 136 has a connection 142 to the adjacent end of the motor 130, and a second connection to one end of a coiled flexible conduit 144 positioned on the rail 110. The opposite end of the conduit 144 is connected to the fluid system as shown in FIG. 8. The fluid motor 130 also has a return spring 146 positioned therein between the piston and rod assembly 128 and the left end of the motor housing as shown in FIG. 5. The return spring 146 is provided to return the piston and rod assembly 128 to an inoperative position when the valve plunger 138 is not actuated. In the inoperative position the cutter tool 124 is raised away from the table. Another conduit 147 (FIG. 8) is connected between the left end of the motor 130 and the valve 136 and provides a by-pass for the motor 130 which enables the spring 146 to move the piston and rod assembly 128 when the plunger 138 is not actuated.

The cutter assembly 24 is operated by taking hold of the handle 140 and moving the assembly to the far end of the track 22 (the top in FIG. 1). The operator then depresses the valve plunger 138 to move the cutter tool 124 downwardly into cutting position. The operator then pulls the cutter assembly 24 along the track 22 while keeping the plunger 138 depressed. At the conclusion of the operation the plunger 138 is released to allow the return spring 146 to restore the cutter tool 124 to inoperative raised position. After a cutting operation is completed, slight downwardly pressure on the edge portion 106a of the glass pane (FIG. 1) will break the glass along the line of the cut. During operation the coiled flexible conduit 144 will be stretched out along the rail 110 and subsequently will return to its unstretched condition. This will provide fluid pressure for operating the cutter tool 124 in all positions of the assembly 24.

In order to prolong the life of the cutter tools 60 and 124 an oil spray device 148 is provided to lubricate the blades 61 and 125 (FIG. 1). The oil spray device 148 includes a tubular member 149 connected to the rail 110 and also a pair of spray nozzles 150 and 151 mounted on one end thereof. One of the nozzles is positioned to spray oil on the cutter blade 61 and the other is positioned to spray on the cutter blade 125. The spray device operates momentarily when the cutter assemblies 20 and 24 are at the ends of their travel just before a cutting operation. The spray device 148 is operated by valves 152 or 153 which respectively control the nozzles 150 and 151. The valve 152 has a plunger 154 which is located to be actuated by the slide members 34 near the end of its travel and the valve 153 has a plunger 155 which is positioned to be actuated by the slide member 116. It is also contemplated to use wicking devices that are bumped by the cutter blades instead of providing spray devices.

Another straight edge or rule 156, similar to the rule 102 is mounted extending parallel to the track 22 to provide means for quickly and accurately locating the frame 104 and the glass 106. It can now be seen that the frame 104 can be quickly and accurately located simply by moving it into abutment with the rules 102 and 156.

When the frame 104 is positioned against the rules 102 and 156 as shown in FIG. 1, hydraulic clamp means are actuated to grip and hold the frame in position while the cutting operations take place. The details of the clamp means are shown in FIGS. 6 and 7. The clamp means are mounted on the underside of the table 12 in the areas of the rules 102 and 156 and the clamp means associated with each rule are similar. The clamp means include clamp members 160 which are pivotally mounted on shafts 162. The shaft 162 for each set of clamps has a centrally located collar 164 mounted thereon, and the collar has a portion 166 connected to a piston and rod assembly 168 of a fluid motor 170. The motor 170 is mounted on a bracket 171 which is hingedly mounted to the underside of the table by a pivot shaft 172 thereby enabling the motor 170 to operate without binding. The shaft 162 is rotatably supported adjacent its ends on pillow blocks 174 which are slidable on the shafts 176 and 178 (FIG. 7). The location of the pillow blocks 174 on the shafts 176 and 178 can be adjusted to enable the clamp members to engage and clamp frames having different width frame members. The clamps 160 are movable by the motor 170 between the inoperative dotted outline position shown in FIG. 6 and the solid outline position engaging the frame members.

With the clamp members actuated by the hydraulic system the frame 104 will be firmly held in position. The glass is then located on the frame 104 with two edges thereof aligned with the two unclamped frame members. The glass is now in position to be cut. The positioning of the glass takes only a few seconds to complete and when the glass is cut it fits the particular frame that was used as a template. As already noted the cutting can be accomplished completely automatically or in the case of assembly 24 it can be accomplished manually.

The hydraulic system for the subject device is shown in FIG. 8. The system includes a connection to a fluid pressure source (not shown) by a conduit 180.

One part of the system includes connected conduits 182, 184, 186, foot operated pedal valve 188, and conduits 190 and 192 which are connected to opposite ends of the fluid motor 58. The conduit 190 is also connected to another conduit 194 which is connected to the valve 86 and from there through the coiled conduit 80 to one end of the cutter operating motor 70. When the assembly 20 is in the left position (FIGS. 1 and 2), the valve plunger 88 associated with the valve 86 is engaged by member 90 to close the valve 86. This prevents fluid pressure from being applied to the left end of the motor 70 and maintains the cutter tool 60 in raised inoperative position. The raised condition of the cutter 60 is maintained as long as the assembly 20 is in its left position and even after the foot pedal 189 is depressed.

When the pedal 189 is depressed it actuates the valve 188 to apply pressure to the left end of motor 58 through the conduits 192 and 193. This causes the rack gear 54 to move to its extended position, and rotates the drive wheel 48 clockwise. This in turn moves the cutter assembly 20 rightwardly across the table. This continues as long as the pedal 189 is held depressed and until the magnetic stud 98 bumps the stop member 100 to stop the movement. During the time the assembly 20 is moving to the right pressure is also applied to the right end of the cutter motor 70 through conduits 192, 195 and 96 to prevent the cutter tool 60 from moving downwardly.

When the assembly 20 is stopped and held in its rightward position with the pedal still depressed the operator as as much time as he needs to make last minute adjustments of the positions of the glass and the frame. When the operator is satisfied that the glass and frame are properly positioned, he will let up on the pedal 189 thereby reversing the position of the pedal valve 188. This causes pressure to be applied to the right end of the drive motor 58 through conduits 190 and 191. At the same time, pressure will also be applied through conduit 194, the valve 86 which is now open because the plunger 188 is not engaged with the member 90, and the coiled conduit 80 to the left end of the motor 70. This causes the piston and rod assembly 68 to move rightwardly in a direction to lower the cutting tool 60 into cutting engagement with the glass. While the cutter tool 60 is being lowered there is a momentary hesitation in the starting of the leftward movement of the assembly 20 due to the magnetic engagement between the stud 98 and the member 100. This is provided to assure that the tool 60 is in cutting position before the assembly starts to move. Thereafter the assembly 20 will move to the left until the member 90 moves against the valve plunger 88 and closes the valve 86. This will stop the assembly and also take pressure off the cutter tool 60 allowing the cutter tool to return to inoperative position. Movement of the tool 60 to inoperative position can be caused by a return spring in the motor 70 or it can be accomplished by providing separate hydraulic means connected to the right end of the motor 70.

An hydraulic system has advantages over an electrical system for the present device because it enables more flexibility in adjusting the cutting pressure and cutting speed.

The clamp means described in connection with FIGS. 6 and 7 are under control of a toggle operated valve 196 (FIG. 8). The toggle valve 196 is actuated when a frame 104 is positioned against the rules 102 and 156 to hold the frame in position as shown in FIG. 1, and is deactuated when the frame is to be removed.

The cutting assembly 24 on the operator's right is not power driven and therefore requires only a single fluid pressure conduit 198 connected to the coiled conduit 144. This supplies pressure for operating the cutter motor 130 under control of the valve 136. When the valve 136 is actuated by pressing on the plunger 138 fluid pressure is applied to the motor 130 through conduit 142, and when the valve plunger is released the spring means 146 in motor 130 will restore the cutter tool 124 to its inoperative raised position. The rail 108 on the track 22 may also be provided with a stop collar 200 to limit forward movement of the assembly 24.

The oiling devices for lubricating the cutting blades has already been described and is shown in FIG. 8 connected to the fluid system by conduit 202.

Figure 9:
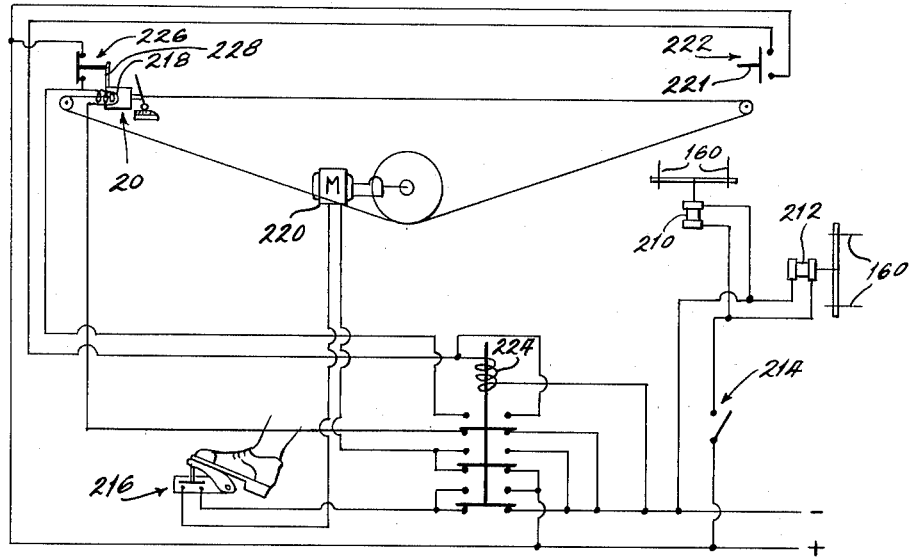
FIG. 9 is a schematic view of an electric circuit for the subject cutting tool.

FIG. 9 shows an electric circuit which can also be used instead of the hydraulic system of FIG. 8 to control the operation of the device. The electric circuit has some advantages over a fluid system particularly because it does not require a special source of power and therefore it enables the machine to be more mobile. Generally speaking, however, experience has favored an hydraulically operated tool over an electrically operated tool.

In the electrically operated machine the clamps 160 are controlled by solenoids 210 and 212 under control of a toggle switch 214. When a frame is properly located on the table the switch 214 is closed to energize the solenoids 210 and 212 and clamp the frame in position. The frame remains clamped until the switch 214 is operated to deenergize the solenoids.

With the frame clamped, a glass pane is properly positioned on the frame and a foot pedal 216 is actuated to set the machine in operation. Actuation of the foot pedal closes a circuit to another solenoid 218 which is mounted on the cutter assembly 20 and is provided to raise the cutter tool 60 to inoperative position. The pedal also energizes drive motor 220 operatively connected to the cutter assembly 20 to move the cutter assembly rightwardly. The assembly moves rightwardly until it bumps into an actuator member 221 on a normally-open limit switch 222. When the actuator 221 is bumped the limit switch 22 closes a circuit which energizes a relay 224. The relay 224 has a plurality of movable contacts which transfer and establish other circuits. One of these circuits reverses the motor connections and by so doing reverses the direction of motor rotation to cause the assembly 20 to move to the left.

Another circuit establishes a hold circuit for the relay 224 and is held energized through a normally closed limit switch 226 which is under control of another member 228 also carried on the assembly 20. The hold circuit maintains the relay 224 energized until the assembly 20 has returned to its left position when the operator 228 moves against and opens the switch 226.

The relay 224 also has normally closed contacts in a circuit that controls the cutter solenoid 218. When the assembly 20 begins to move to the right the solenoid 218 is energized and moves the cutter tool 60 upwardly into inoperative position. Therefore, as the motor moves the assembly 20 to the right the cutter tool is raised and not engaged with the glass. However, when the assembly 20 reaches the end of its rightward travel and actuates the switch 222 to energize the relay 224, relay contacts in the circuit of the solenoid 218 open to deenergize the solenoid and to allow the cutter tool to move down into cutting engagement with the glass. This condition maintains until the member 228 engages and opens the switch 226 to deenergize the solenoid 218. The cycle can be repeated using the same or a different frame.

The assembly 24 like the assembly 20 can also be made automatic or as already pointed out it can be manual since it is relatively more accessible to the operator.

Many other variations and refinements of the electrical and hydraulic systems can be made without changing the basic nature of the invention.

Thus there has been shown and described a novel and versatile glass cutting tool or the like which fulfills all of the objects and advantages sought therefor. Many changes, modifications and variations of the device, however, will become apparent to those skilled in the art after considering this specification which discloses several embodiments thereof in conjunction with the accompanying drawings. All such changes, modifications and variations which do not depart from the spirit and scope of the invention are deemed to be covered by the invention which is limited only by the claims which follow.

What is claimed is:

1. A tool for cutting glass to fit a frame comprising a table with a work surface thereon, means on the table for accurately locating a frame in position to be used as a template for locating a glass pane to be cut to fit the frame, means movable into engagement with the frame to clamp the frame in said position, means on the frame for locating two adjacent sides of a glass pane to be cut to fit the frame, a pair of angularly related guide rails mounted above the table and extending parallel respectively to two different sides of the frame along which the glass pane is to be cut, a cutter assembly movably mounted on each of said guide rails, the frame locating means being positioned adjacent to the guide rails, each of said cutter assemblies having a cutter blade mounted on a movable support member in position to be moved into cutting engagement with a glass pane positioned on the frame to cut said pane along lines corresponding respectively to said different sides of the frame, means for selectively moving the blade support members between inoperative positions in which the associated blades are spaced from the pane and operative positions in which the associated blades are in cutting engagement with the pane, and means for moving said cutter assemblies back and forth along their associated rails, each of said blades being in cutting engagement with the pane during one direction of movement of the associated assembly.

2. The tool defined in claim 1 wherein motor means are provided for moving at least one of said cutter assemblies along its associated guide rail.

3. The tool defined in claim 1 wherein motor means are provided for moving at least one of said blade support members between its operative and inoperative positions.

4. The tool defined in claim 1 wherein means are provided at one end of each guide rail for lubricating the associated cutter blades.

5. The tool defined in claim 1 wherein said clamp means include a member pivotally mounted under the table, and means for moving said member between an inoperative position spaced from the frame and an operative position engaging the frame.

6. A tool for cutting a glass pane along two angularly related directions so that it will fit a frame structure defined by pairs of opposed connected frame members which define an opening for receiving the glass pane comprising a table with a working surface thereon, a pair of angularly related abutment members on said table in position to engage and accurately locate a frame structure moved thereagainst, means on the table movable into engagement with the frame structure to clamp the frame structure into engagement with said abutment members, means on the frame structure for engaging and accurately locating two adjacent side edges of a pane of glass to be cut to fit the frame, a guide rail mounted extending above the table and parallel respectively to each of said adjacent side edges of the pane of glass, a glass cutter assembly movable along each of said guide rails, the frame locating means being positioned adjacent to the guide rails, each of said assemblies including a cutter blade and movable support means therefor, means respectively for moving each of said cutter blades between an inoperative position spaced from the glass pane and a position in which the blade is in cutting engagement therewith, and means for moving each of said cutter assemblies along its associated guide rail while the associated blade is engaged with the glass, said blades being positioned respectively to engage and cut the glass along two directions so that the cut glass will fit the frame structure.

7. The tool for cutting a glass pane defined in claim 6 wherein said means for moving the cutter blades include hydraulic means.

8. The tool for cutting a glass pane defined in claim 6 wherein said means for moving the cutter blades include solenoid means.

9. A tool for cutting glass panes and the like along two angularly related directions to fit a rectangular frame structure comprising a table with a working surface thereon, abutment means positioned on the table to engage and accurately locate a frame structure moved thereagainst, means movable into engagement with the frame structure to clamp the frame structure into engagement with said abutment means, means on the frame structure for locating at least two sides of a pane of glass to be cut to fit the frame, a guide rail positioned extending parallel to each of two adjacent sides of the frame structure, a cutter assembly movably mounted on each of said guide rails, the frame locating means being located adjacent to the guide rails, each of said cutter assemblies including a cutter element and means for moving said cutter element between positions in which it is spaced from the glass pane and in which it is in engagement therewith, said last named means including means for applying cutting pressure against the glass, and means for moving each of said cutter assemblies alternately back and forth along the associated guide rails.

10. A tool for cutting panes of glass to fit rectangular frames comprising a pair of tracks mounted in perpendicular relationship to each other, a cutting assembly including a cutter blade movably mounted on each of said tracks, means for accurately locating a rectangular frame structure such that the said tracks are parallel respectively to two adjacent sides of the frame structure, the frame locating means being positioned adjacent to the said tracks, means for clamping the frame structure in immobile condition during a glass cutting operation, means on the frame structure for accurately locating two side edges of a glass pane to be cut to fit the frame structure, the opposite sides of said pane overlapping the opposite sides of the frame structure, and means for moving the cutting assemblies along their respective tracks while the associated cutter blades are in cutting engagement with the glass pane.

11. The tool defined in claim 10 wherein motor means are provided for moving at least one of said cutting assemblies along its associated track, and means for stalling the said motor driven cutting assembly prior to a cutting operation long enough for the associated cutter blade to be moved into cutting engagement with the glass.

References Cited by the Examiner
UNITED STATES PATENTS

| | | | |
|---|---|---|---|
| 418,961 | 1/1890 | Pressley et al. | 83—467 |
| 1,988,565 | 1/1922 | Owen | 225—96.5 |
| 2,524,344 | 10/1950 | English | 83—522 |
| 2,619,775 | 12/1952 | Judd | 225—96.5 |
| 2,705,389 | 4/1955 | Wyman | 225—96.5 |
| 2,711,617 | 6/1955 | Trammell | 225—96.5 |
| 3,164,046 | 1/1965 | Arnoud | 83—341 |

FOREIGN PATENTS

| | | |
|---|---|---|
| 564,276 | 10/1958 | Canada. |
| 668,633 | 8/1963 | Canada. |
| 164,718 | 11/1905 | Germany. |
| 3,673 | 2/1911 | Great Britain. |

ANDREW R. JUHASZ, *Primary Examiner.*

J. B. McGUIRE, *Assistant Examiner.*